July 25, 1944.　　　　B. HOPPER　　　　2,354,595
TWO-STAGE ALKYLATION PROCESS
Filed June 20, 1939
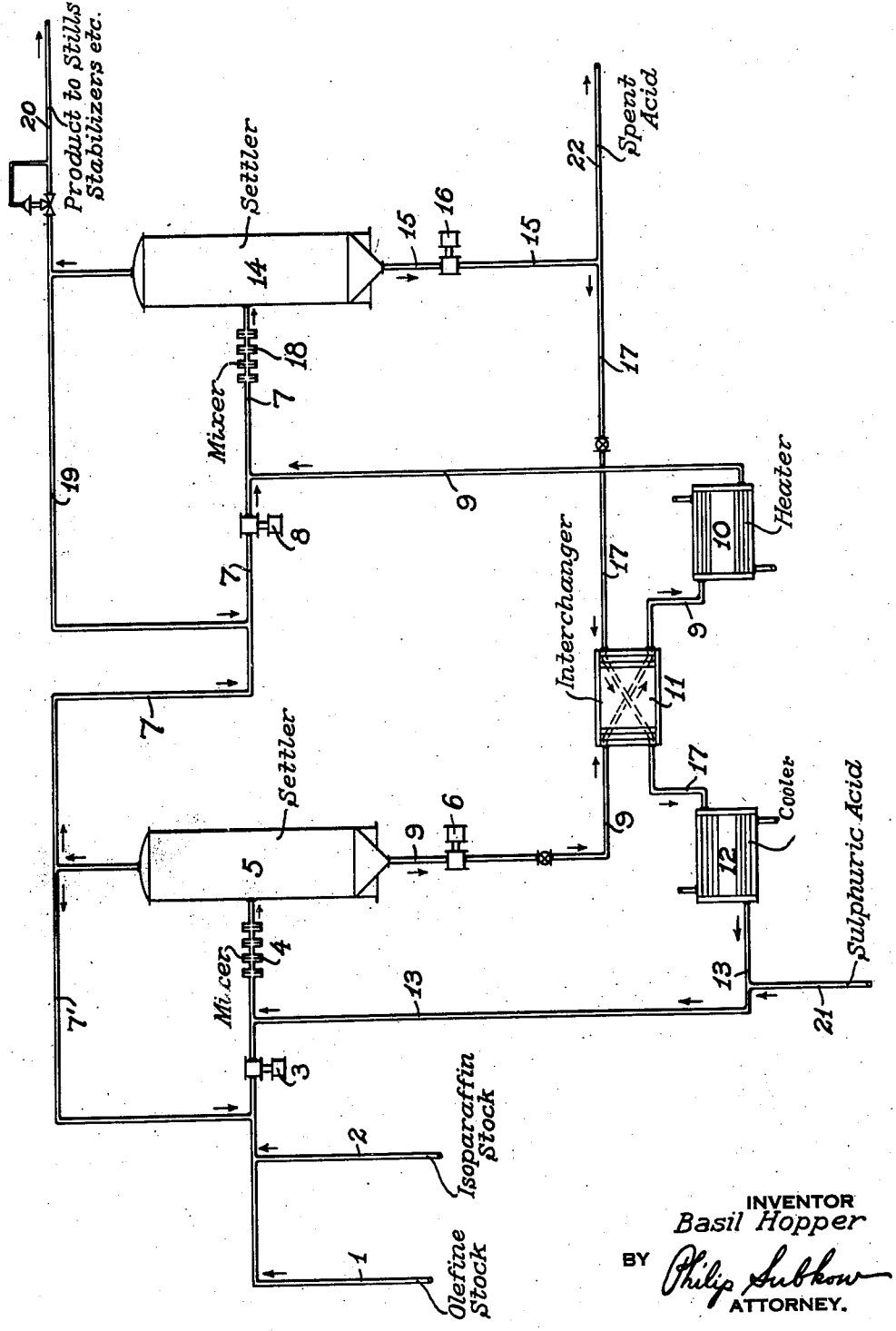
INVENTOR
*Basil Hopper*
BY *Philip Subkow*
ATTORNEY.

Patented July 25, 1944

2,354,595

UNITED STATES PATENT OFFICE 2,354,595

TWO-STAGE ALKYLATION PROCESS

Basil Hopper, Palos Verdes Estates, Calif., assignor to Union Oil Company of California, Los Angeles, Calif., a corporation of California Application June 20, 1939, Serial No. 280,121

4 Claims. (Cl. 260—683.4)

This invention relates to a process for the production of alkylated hydrocarbons from hydrocarbon fractions containing olefins and fractions containing isoparaffins.

When an olefin, such as butylene, is mixed with an isoparaffin, such as isobutane, and this mixture of hydrocarbons is contacted with sulphuric acid having an $H_2SO_4$ concentration between about 92% and 100% the olefin combines with the isoparaffin to form a saturated side chain isoparaffin. In carrying out this reaction between the olefin and the isoparaffin in the presence of sulphuric acid there are two competing reactions, i. e., alkylation and polymerization. Conditions of temperature, pressure, dilution ratio and acid strength must, therefore, be selected which will produce maximum alkylation and a minimum amount of polymerization providing it is desired to produce the side chain isoparaffins.

In carrying out the alkylation of isoparaffins with olefins it is desirable at all times to have a high ratio of isoparaffins to olefins since the ratio between these two reacting components governs to a large degree the polymerization of the olefins. It is, therefore, desirable to employ a ratio of at least ten parts of isoparaffin to one part of the olefin and preferably a ratio in the order of fifty to one or one hundred to one.

In carrying out the alkylation of isoparaffins with olefins it is also desirable to employ sulphuric acid having an $H_2SO_4$ concentration between 95% and 100%. However, I may employ sulphuric acid having an actual $H_2SO_4$ concentration as low as 92%. Below this latter concentration the sulphuric acid ceases to be an efficient alkylation catalyst and begins to favor the polymerization of olefins.

In the alkylation of butylene with isobutane it is desirable to employ a temperature between 30° F. and 60° F. and preferably in the order of 55° F. Furthermore, it is desirable to maintain sufficient pressure on the reactants to maintain them in a liquid state.

When propylene is alkylated with isobutane it is desirable to employ a temperature between 70° F. and 100° F. and preferably a temperature around 80° F. At temperatures below 70° F. no appreciable alkylation takes place between propylene and the isoparaffin (isobutane or isopentane); the propylene to a large extent simply passes into solution in the sulphuric acid.

Where a mixed olefin fraction containing, as for example, propylene and butylene is alkylated with an isoparaffin such as isobutane in the presence of a catalyst such as sulphuric acid having an $H_2SO_4$ concentration between 95% and 100% I prefer to proceed as follows:

The olefin stock containing the butylene and propylene is mixed with an isoparaffin such as isobutane in the proportion of at least ten parts of the isobutane to one part of the olefin stock. This mixture is then contacted with sulfuric acid having an $H_2SO_4$ concentration between 95% and 100% and at a temperature between 30° F. and 60° F. At this temperature the butylene reacts with the isobutane to produce alkylated hydrocarbons but there is no appreciable reaction between the propylene and the isobutane. A large portion of the propylene passes into solution in the sulphuric acid.

After the initial contact between the sulphuric acid and the isobutane mixed with butylene and propylene this mixture is passed into a settling chamber and the acid phase is separated from the alkylated products and unreacted gases. The acid phase containing the dissolved propylene is heated to increase its temperature at a point in the range between 70° F. and 100° F. and preferably around 80° F. and at this temperature the sulphuric acid containing the dissolved propylene is contacted with a further quantity of the isobutane or other isoparaffin which reacts with the olefin dissolved in the sulphuric acid to form a further quantity of alkylated hydrocarbon. This mixture then passes to another settling chamber where the alkylated hydrocarbon and unreacted gases are separated from the sulphuric acid. Providing this acid has not dropped to an $H_2SO_4$ concentration below 92% it may be used again either in the first or second stage of the process for further alkylation.

The object of the invention, therefore, resides in contacting a series of olefins, preferably propylene and butylene mixed with an isoparaffin, such as isobutane, with sulphuric acid having an $H_2SO_4$ concentration between 92% and 100% and preferably 96% at a temperature at which one of the olefins reacts with the isoparaffin to form an alkylated hydrocarbon and at which temperature another olefin of the series does not react to any appreciable extent with the isoparaffin but simply passes into solution in the sulphuric acid, then recovering the sulphuric acid containing the dissolved olefin, increasing the temperature of this acid to a point at which the dissolved olefin will react with an isoparaffin, such as isobutane, and then contacting the sulphuric acid with the isoparaffin.

Other objects will appear from the disclosure in connection with the flow diagram.

As explained above it is desirable to employ sufficient pressure in each stage of the process to maintain the reacting hydrocarbons in a liquid state.

The olefin stock which I prefer to use may consist of a mixture of gases containing olefin molecules of more than two carbon atoms and less than thirteen carbon atoms or it may consist of polymerized olefins produced by contacting gaseous olefins with phosphoric or sulphuric acid or it may contain both gaseous and polymerized olefins. Preferably I wish to employ olefin fractions containing propylene and butylene. As isoparaffin stock I prefer to use isobutane or isopentane or a mixture of these isoparaffins.

Referring to the drawing, olefin stock is introduced into the system through line 1, isoparaffin stock is introduced through line 2. Pump 3 then passes the mixture of olefin and isoparaffin stock together with acid introduced through line 13 into mixer 4 where the mixture of olefin, isoparaffin and acid is thoroughly mixed. This mixture then passes into settler 5 which is maintained in the order of 30° F. to 60° F. From the top of settler 5 the alkylated hydrocarbons and unreacted olefins and isoparaffins are withdrawn, a portion of this mixture may be recycled to mixer 4 through line 7' and another portion of this material may be continuously withdrawn through line 7.

The acid phase in settler 5 is withdrawn from the bottom of this settler and passed by means of pump 6 through heat exchanger 11 and heater 10 and through line 9 to mixer 18 where it is thoroughly mixed with unreacted isoparaffins withdrawn from settler 5 which are introduced through line 7 and pump 8 into mixer 18. The temperature of the materials in mixer 18 is preferably maintained within the range of 70° F. to 100° F. The materials in mixer 18, after thorough mixing, are passed into settler 14 where the alkylated products together with the unreacted gases are separated from the acid phase. A portion of the alkylated products and unreacted gases may be returned to mixer 18 through line 19 and another portion of this material may be withdrawn through line 20 and passed to the fractionating tower for the separating of the alkylated hydrocarbons from the unreacted gases.

The acid phase withdrawn from settler 14, through line 15 passes by means of pump 16 through line 17 and interchanger 11 and cooler 12 back to line 13 where it is used in the first alkylation stage. Fresh acid may be introduced into the system through line 21 and spent acid may be withdrawn through line 22.

As explained above, the mixture of propylene and butylene is contacted with isoparaffin in mixer 4 at a temperature between 30° F. and 60° F. This contact causes a reaction to take place between the butylene and the isoparaffin but the major portion of propylene remains dissolved in the acid phase at this temperature. The acid phase in settler 5 is withdrawn, as explained above, through line 9 and after its temperature has been raised to a point between 70° F. and 100° F. it is contacted with isoparaffin in mixer 18. At this temperature the propylene dissolved in the sulphuric acid reacts with the isoparaffin to form alkylated hydrocarbons which are withdrawn, as explained above, through lines 19 and 20.

By this method I am able to produce a greater yield of alkylated hydrocarbons than can be obtained providing the mixture of olefins are mixed with the isoparaffin and then contacted with the sulphuric acid catalyst at one temperature.

It is, therefore, an object of the present invention to contact a mixture of olefins with sulphuric acid and isoparaffins at a temperature wherein one of the olefins reacts with isoparaffins to form alkylated hydrocarbons and the major portion of the other olefins remains in a dissolved state in the sulphuric acid, to separate the acid solution of the unreacted olefins from the alkylated hydrocarbons and after raising its temperature to a point wherein it readily reacts with an isoparaffin, thereafter contacting the heated acid containing the dissolved olefin with an isoparaffin to form a further quantity of alkylated hydrocarbons.

As a further modification of the process the isoparaffin may be mixed with the acid phase withdrawn from the feed stage containing the dissolved olefin and this mixture may then be heated until it reaches a temperature at which the olefin will react with the isoparaffin.

My method of alkylation is also applicable to processes in which the unsaturated hydrocarbon stock employed is predominately composed of single olefins, such as for example, propylene or butylene. To illustrate, if butylene and isobutane are contacted with sulphuric acid of 92% to 100% concentration at a temperature between 30° F. and 60° F. and preferably around 55° F. and preferably under sufficient pressure to mantain the reacting hydrocarbons in a liquid state I find that a certain amount of butylene dissolves in the sulphuric acid. If the acid phase containing the dissolved butylene is contacted with isobutane within the temperature range between 30° F. and 60° F. and preferably around 55° F. and preferably under sufficient pressure to maintain the isobutane in a liquid state it is possible to react a substantial portion of the dissolved butylene with the isoparaffin and thereby form additional alkylated hydrocarbons. Furthermore, where a fraction rich in propylene has been mixed with an isoparaffin and contacted with sulphuric acid having a concentration between 92% and 100% $H_2SO_4$ the same phenomena occurs as in the case of the butylene, set forth above. Between the temperatures of 70° F. and 100° F. a greater proportion of the propylene tends to react with the isoparaffin to form alkylated hydrocarbons, however, the reaction is not complete and some of the propylene remains dissolved in the acid. This dissolved propylene may be converted into alkylated hydrocarbons by contacting the sulphuric acid with an isoparaffin, such as isobutane.

The foregoing description is not to be taken as limiting, but only illustrative of my invention as many variations may be made by anyone skilled in the art coming within the scope of the following claims.

I claim:

1. A process for the production of alkylated hydrocarbons which comprises reacting an isoparaffin with an olefin in the presence of concentrated sulphuric acid thereby forming alkylated hydrocarbons and dissolving a portion of the olefin in the sulphuric acid, separating the hydrocarbon phase containing unreacted isoparaffin in admixture with said alkylated hydrocarbons from the sulphuric acid phase containing the dissolved olefin, recycling a portion of said hydrocarbon phase to said stage, and contacting said acid phase containing the dissolved olefin with said hydrocarbon phase at a temperature higher than that employed during the initial contacting step of the isoparaffin, olefins and acid and thereby forming additional alkylated hydrocarbons.

2. A process for the production of alkylated hydrocarbons which comprises mixing an olefinic hydrocarbon fraction containing propylene and butylenes with an isoparaffinic hydrocarbon fraction containing isobutane, alkylating the butylenes in said mixture in one stage of the process by contacting the mixture with concentrated sulfuric acid at a temperature between 30° F. and 60° F., separating the resulting acid phase containing dissolved unreacted propylene from the resulting hydrocarbon phase containing unreacted isobutane and alkylated hydrocarbons, recirculating a portion of said hydrocarbon phase to said stage, and mixing the remainder of said hydrocarbon phase with said acid phase in a subsequent stage at a temperature between 70° F. and 100° F. so as to alkylate said propylene dissolved therein.

3. A process for the production of alkylated hydrocarbons which comprises mixing an olefinic hydrocarbon fraction with an isoparaffinic hydrocarbon, alkylating a portion of the olefins in said mixture in one stage of the process by contacting the mixture with concentrated sulfuric acid, separating the resulting acid phase containing dissolved unreacted olefins from the resulting hydrocarbon phase containing unreacted isoparaffin and alkylated hydrocarbons, recirculating a portion of said hydrocarbon phase to said stage, and mixing the remainder of said hydrocarbon phase with said acid phase in a subsequent stage at a temperature higher than that employed in the aforesaid stage so as to alkylate said olefins dissolved therein.

4. A process for the production of alkylated hydrocarbons which comprises mixing an olefinic hydrocarbon fraction with an isoparaffinic hydrocarbon, alkylating a portion of the olefins in said mixture in one stage of the process by contacting the mixture with concentrated sulfuric acid, separating the resulting acid phase containing dissolved unreacted olefins from the resulting hydrocarbon phase containing unreacted isoparaffin and alkylated hydrocarbons, recirculating a portion of said hydrocarbon phase to said stage, and mixing an isoparaffin mixture comprising another portion of said hydrocarbon phase with said acid phase in a subsequent stage at a temperature higher than that employed in the aforesaid stage so as to alkylate said olefins dissolved therein.

BASIL HOPPER.